(12) United States Patent
Vega et al.

(10) Patent No.: US 6,218,942 B1
(45) Date of Patent: Apr. 17, 2001

(54) RADIO FREQUENCY IDENTIFICATION TAG EXCITER/READER

(75) Inventors: Victor Allen Vega, Hercules; Sebastian Thomas Kakkanad, San Jose, both of CA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/151,904

(22) Filed: Sep. 11, 1998

Related U.S. Application Data

(63) Continuation-in-part of application No. 09/045,357, filed on Mar. 20, 1998, and a continuation-in-part of application No. 09/041,480, filed on Mar. 12, 1998, now Pat. No. 6,040,773, and a continuation-in-part of application No. 09/031,848, filed on Feb. 27, 1998, now abandoned, which is a continuation-in-part of application No. 08/540,813, filed on Oct. 11, 1995, now abandoned.

(51) Int. Cl.$^7$ .................................................. G08B 13/14
(52) U.S. Cl. ........................... 340/572.1; 340/572.7; 340/693.6; 340/673; 340/676
(58) Field of Search ............... 340/572.7, 572.1, 340/693.6, 693.5, 673, 676

(56) References Cited

U.S. PATENT DOCUMENTS

| | | | |
|---|---|---|---|
| 5,650,768 | * 7/1997 | Eswaran | 340/572.1 |
| 5,801,371 | * 9/1998 | Kahn et al. | 235/472 |
| 5,850,187 | * 12/1998 | Carrender et al. | 340/572.1 |

* cited by examiner

Primary Examiner—Julie Lieu
(74) Attorney, Agent, or Firm—Terri S. Hughes

(57) ABSTRACT

A radio frequency identification tag exciter/reader (10) is arranged for operation in association with an article transport device (100). The radio frequency identification tag exciter/reader (10) includes a canopy assembly (12) into which an exciter antenna (22) and a reader antenna (24) are positioned. A base station (26) is further provided and is coupled to the exciter antenna (22) and the reader antenna (24). The base station (26) provides an excitation signal (36) and receives a read signal (38). The base station further communicates with a system element (34). A hand held radio frequency identification tag exciter/reader (900) includes a hand holdable housing (912) including an exciter antenna (922) and a reader antenna (924). The housing is coupled to a portable base station (926). The base station (926) provides an excitation signal (936) and receives a read signal (938). The base station further communicates with a system element (934) via radio signals (932, 933).

39 Claims, 10 Drawing Sheets

RADIO FREQUENCY IDENTIFICATION TAG EXCITER/READER

CROSS-REFERENCE TO RELETED APPLICATIONS

This is a continuation-in-part of commonly assigned prior U.S. patent application Ser. No. 09/031,848 filed Feb. 27, 1998 ABN, by Victor Allen Vega et al., titled "Radio Frequency Identification Tag System Using Tags Arranged for Coupling to Ground," now abandoned the disclosure of which is hereby expressly incorporated herein by reference, verbatim and with the same effect as though it were fully and completely set forth herein.

Also, this is a continuation-in-part of commonly assigned prior U.S. patent application Ser. No. 09/041,480 filed Mar. 12, 1998 by Victor Allen Vega et al., titled "Radio Frequency Identification Tag Arranged for Magnetically Storing Tag State Information " now U.S. Pat. No. 6,040,773 issued Mar. 21, 2000," the disclosure of which is hereby expressly incorporated herein by reference, verbatim and with the same effect as though it were fully and completely set forth herein.

Also, this is a continuation-in-part of commonly assigned prior U.S. patent application Ser. No. 09/045,357 filed Mar. 20, 1998 by Victor Allen Vega et al., titled "Radio Frequency Identification Tag With A Programmable Circuit State." Which is a C-I-P of Ser. No. 08/540,813 filed Oct. 11, 1995 ABN.

FIELD OF THE INVENTION

The present invention relates generally to radio frequency identification tag exciter/readers including but not limited to radio frequency identification tag exciter/readers arranged in association with an article transport device and radio frequency identification tag exciter/readers arranged for hand held operation.

BACKGROUND OF THE INVENTION

Radio frequency identification tags and radio frequency identification tag systems are known, and find numerous uses. In general, radio frequency identification tags are capable of retaining and, in operation, transmitting a substantial amount of information—sufficient information to uniquely identify individuals, packages, inventory and the like. The radio frequency identification tag is also capable of receiving and storing information. In a read/write application, the base station is not only capable of sending an excitation signal and receiving a response from the radio frequency identification tag, but it is also capable of sending a data, or write, signal to the radio frequency identification tag. The radio frequency identification tag receives the write signal, which may contain data to be stored within the tag, a code or a command. Depending on the type of write signal, the radio frequency identification tag responds accordingly, such as by storing the data or acting upon the command.

In the past, the read range of the radio frequency identification tag was relatively small. Thus, in order to read the information from the tag, an exciter/reader would have to be brought very close to the article which tag was being read, and/or the article brought very close to the exciter/reader. Neither of these conditions are possible when the articles are being automatically transported along conveyors and similar material handling devices. Thus, radio frequency identification tag technology has not, to date, found widespread use in manufacturing, article conveyance, inventory management, parcel delivery tracking and similar applications.

Advances in radio frequency identification tag technology set forth in the above-referenced and incorporated United States patent applications greatly increase the read ranges of radio frequency identification tags. With improved read ranges, radio frequency identification tags become a desirable technology for article tracking in manufacturing, inventory and sales applications as well as in mail and parcel delivery services. The improvements provide increased read ranges and reduced sensitivity to orientation. And, unlike optical technologies, such as bar codes, do not require line of sight access. However, exciter/reader devices are not available for these applications.

Thus there is a need for a radio frequency identification tag exciter/reader.

DETAILED DESCRIPTION OF THE PREFERRED EMBODIMENTS

The present invention is described in terms of several preferred embodiments. For example, the present invention is described in terms of several preferred embodiments relating to a radio frequency identification tag exciter/reader arranged in association with an article transport device. The present invention is also described in terms of several preferred embodiments relating to a radio frequency identification tag exciter/reader arranged for hand held use. It will be appreciated that the preferred embodiments are presented by way of example only and should in no way be considered limiting of the broad scope and principles of the present invention.

Figure 1:
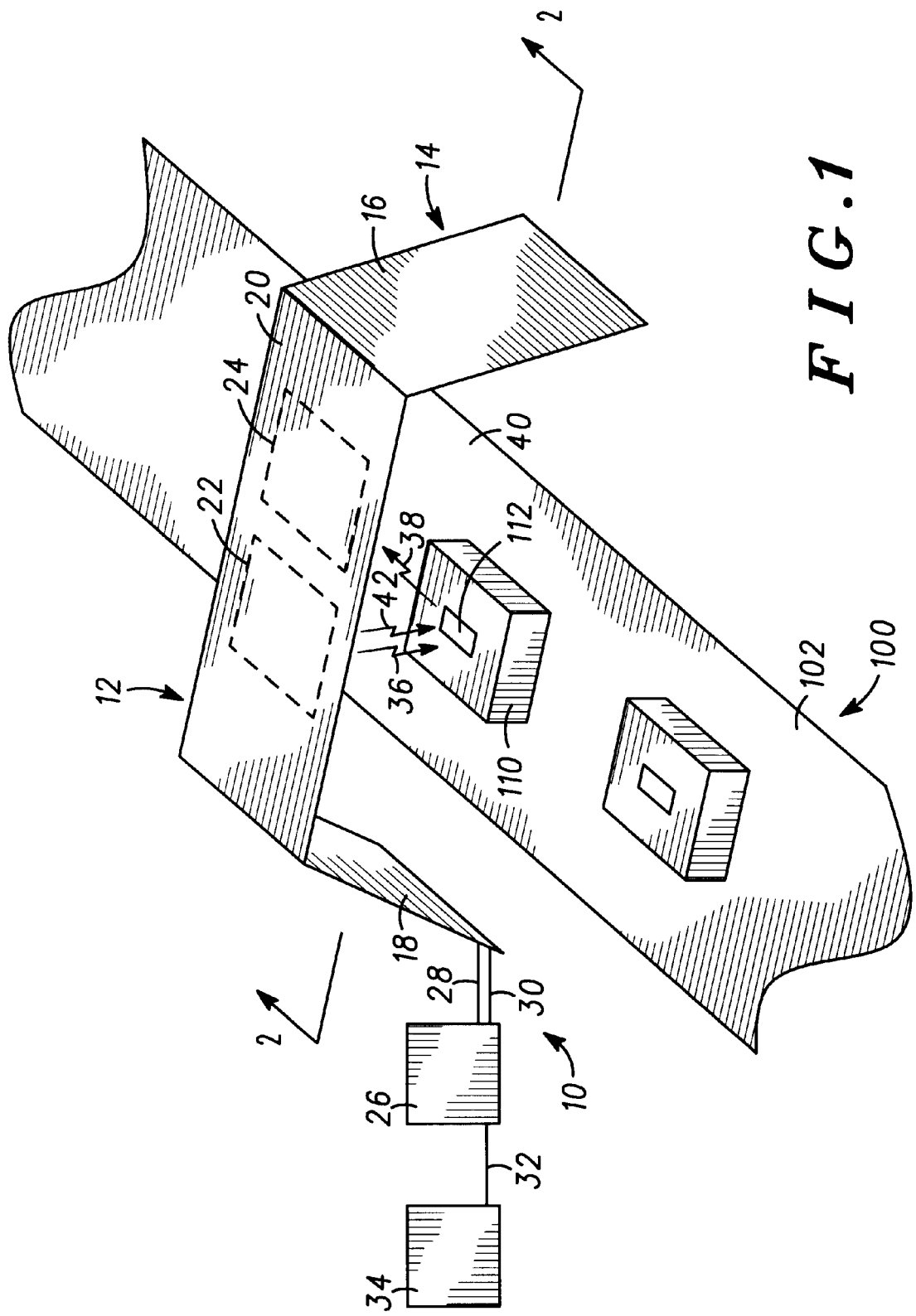
FIG. 1 is a perspective view of a radio frequency identification tag exciter/reader arranged in association with an article transport device and in accordance with one preferred embodiment of the present invention.

Referring to FIG. 1 of the drawings, a radio frequency identification tag exciter reader 10 is arranged in association with an article transport device 100. Article transport device 100 may be an article or package conveyor used in a package/parcel delivery operation, a mail distribution center, a warehouse operation, a manufacturing operation, a baggage handling operation or the like. Moreover, while shown in a substantially straight horizontal configuration, article transport device 100 may be arranged in virtually any orientation and thus may be vertical, inclined, curved or spiral. Article transport device 100 may further include diverter arrangements for providing article sorting as are well known in the art. Still further, while shown to include for moving articles a belt 102 coupled to a source of drive power (not shown), such as driven and idle rollers, gear and chain, friction wheel, and the like, article transport device 100 may be formed to include individual article carriers carried over a track, monorail or other transport system. The foregoing examples of arrangements for article transport device 100 are in no way intended to be limiting, and in fact, are intended to illustrate the broad application of the present invention to virtually any known article transport device, mechanism or system.

Radio frequency identification tag exciter/reader 10 includes supported above belt 102 an exciter/reader canopy assembly ("canopy assembly") 12. Canopy assembly 12 has a vertical support structure 14, including a first side support member 16 and a second side support member 18, supporting a horizontal canopy member ("canopy member") 20 above belt 102. As will be described in accordance with the several preferred embodiments of the present invention, canopy assembly 12 is arranged to include at least an exciter antenna 22 and a reader antenna 24.

Exciter antenna 22 is coupled by an antenna lead 28 to a base station 26 and reader antenna 24 is coupled by an antenna lead 30 to base station 26. Base station 26 includes appropriate processing, modulation and amplification capability for generating an exciter signal and coupling the exciter signal to exciter antenna 22. Base station 26 also includes suitable processing and demodulation capability to receive and process a read signal from reader antenna 24. For example, a suitable base station is a modified ASR-120 base station (part no. 05200-006) available from Indala Corporation, a wholly-owned subsidiary of Motorala, Inc., 3041 Orchard Parkway, San Jose, Calif. 95134. For purposes of illustration only, base station 26 is shown as a single element apart from canopy assembly 12. It will be appreciated the appropriate that base station electronics may be incorporated into canopy assembly 12, such as in canopy member 20 or vertical support structure 14 without departing from the fair scope of the present invention. Moreover, the exciter electronics may be implemented separately from the reader electronics again without departing from the fair scope of the present invention. Base station 26 is further shown coupled by bus 32, or other suitable communication link, to other system elements, generally indicated as system element 34. System element 34 may be an inventory tracking system, an article sorting system, a manufacturing system, etc. to which base station 26 provides information regarding the article and packages being transported in the system.

More particularly, and with continued reference to FIG. 1, an article 110 includes a radio frequency identification tag 112 secured to some portion of the article. As is known, radio frequency identification tag 112 includes at least one antenna, and potentially multiple antenna elements for receiving an exciter signal and for generating and transmitting a read signal. As article 110 enters an excite/read zone 40 under canopy assembly 12, an exciter signal 36 is coupled from exciter antenna 22 to radio frequency identification tag 112. Radio frequency identification tag 112 becomes energized in the presence of exciter signal 36, and in accordance with its circuitry and programming, generates a read signal 38, which is coupled from radio frequency identification tag 112 to reader antenna 24. It will be appreciated that read/write operations may be accomplished, and in this regard, base station 26 may be arranged to provide in addition to exciter signal 36, a write, or data, signal 42. Radio frequency identification tag 112 receives write signal 42, which may contain data to be written to a memory contained within radio frequency identification tag 112, a code to be stored or a command to be acted upon. Radio frequency identification tag 112 provides the appropriate response to write signal 42, and if appropriate, responds by generating read signal 38 based upon the newly stored information.

Figure 2:
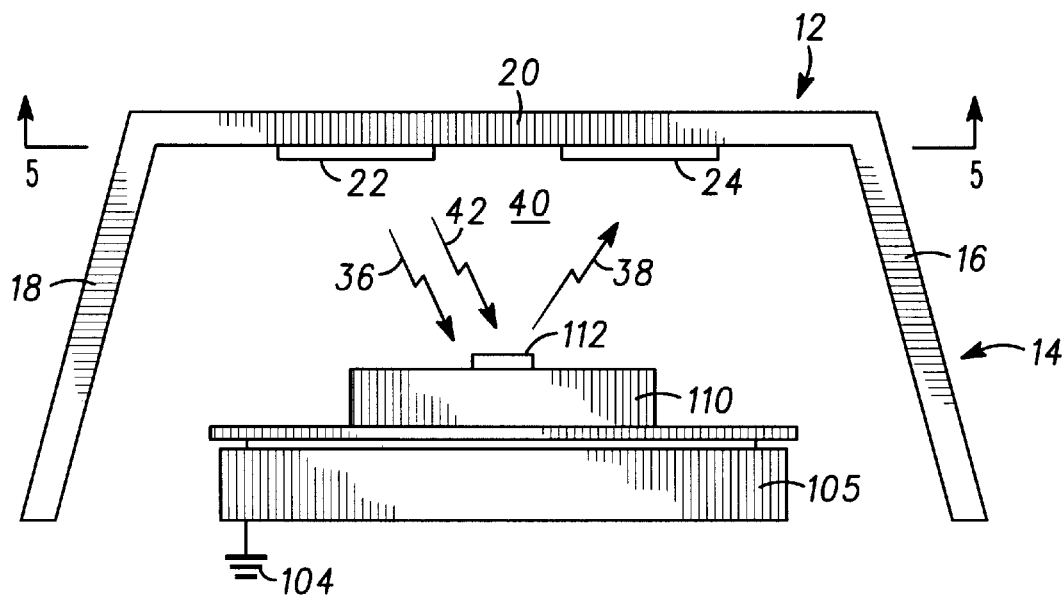
FIG. 2 is a cross-section view taken along line 2—2 of FIG. 1.

With continued reference to FIG. 1 and reference also to FIG. 2, radio frequency identification tag exciter/reader 10 is arranged for use with radio frequency identification tags arranged for coupling to ground. Such radio frequency identification tags are shown and described, for example, in the aforementioned United States patent application Ser. No. 09/036,848 titled "Radio Frequency Identification Tag System Using Tags Arranged for Coupling to Ground." Belt 102 is preferably formed from a non-conductive material, and for example, belt 102 may comprise a nylon or rubber or similar material supported over the conveyor structure 105. Radio frequency identification tag 112 couples to conveyor structure 105, via article 110, and hence to ground 104. Exciter antenna 22 formed, for example, from a plate of copper is a monopole antenna, and the excitation current path is completed through base station 26 to ground. Reader antenna 24 may be similarly formed from a copper plate. It should be understood that either or both of exciter antenna 22 and reader antenna 24 may be formed from, for example, wire or other conductive material.

Figure 3:
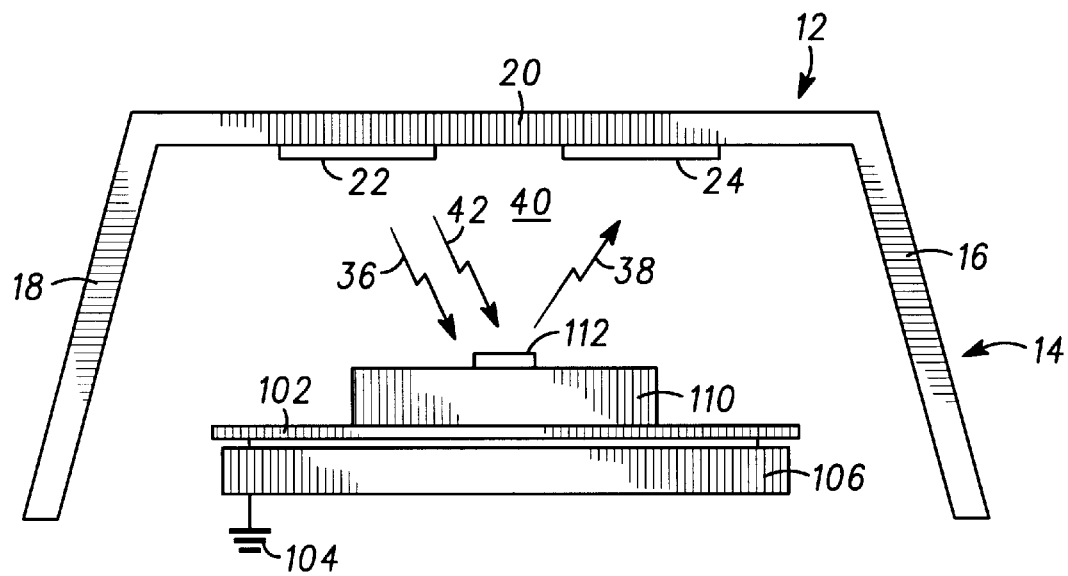
FIG. 3 is a cross-section similar to FIG. 2, and illustrating an alternate preferred embodiment of the present invention.

In an alternate arrangement shown in FIG. 3, belt 102 is constructed from a non-conductive material, such as nylon mesh, rubber, etc. At least within excite/read zone 40, article transport device 100 includes a conductive plate 106 secured below belt 102. Conductive plate 106 may be formed, for example, from a copper plate or other suitable conductive material and is coupled to ground 104. In operation, radio frequency identification tag 112 couples to plate 106 via article 110 and hence to ground 104. Belt 104 may alternatively be constructed from a conductive material, but this limits use to 5-sided read capability.

Figure 4:
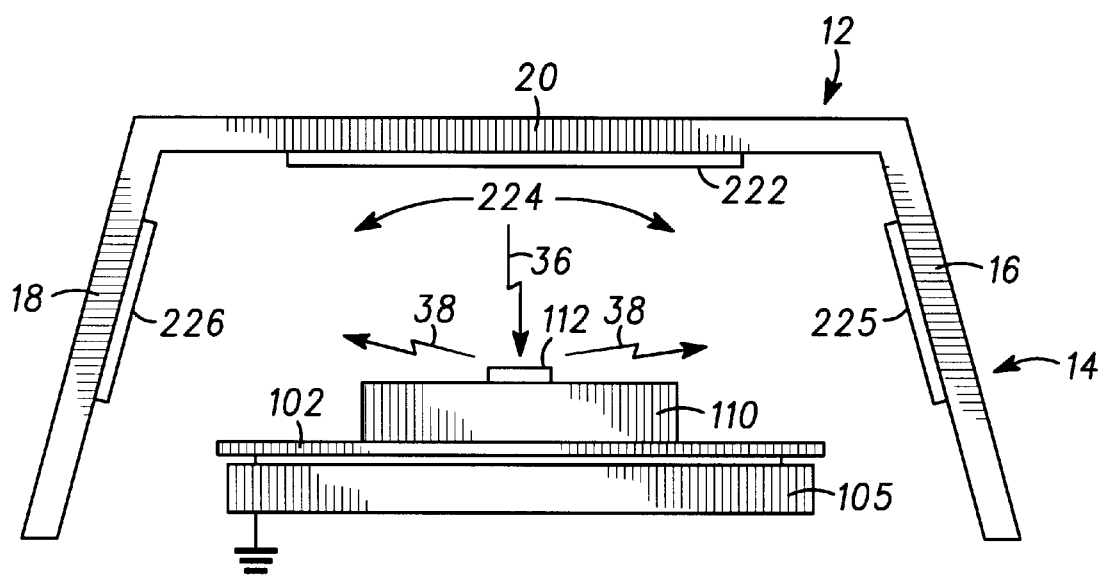
FIG. 4 is a cross-section similar to FIG. 2, and illustrating another alternate preferred embodiment of the present invention.

Referring to FIG. 4, a radio frequency identification tag exciter/reader is shown. Same or similar elements from the preceding embodiments are identified by like reference numerals. Canopy assembly 12 is formed as before, however, an enlarged exciter antenna 222 is secured to canopy member 20. Reader antenna 224 includes a first reader antenna element 225 and a second reader antenna element 226. First reader antenna element 225 is secured on an inner portion of first vertical support member 16, and second reader antenna element 226 is secured on an inner portion of second vertical support member 18. Exciter signal 36 is coupled from exciter antenna 222 to radio frequency identification tag 112, which as described generates a read signal 38. Read signal 38 is coupled to each of first reader antenna element 225 and second reader antenna element 226. Thus, radio frequency identification tag exciter/reader may provide a form of diversity reception of read signal 38. It will be appreciated that base station 26 is arranged with suitable processing to perform, for example, diversity selection, diversity combining, or other suitable processing of read signal 38 for recovering the data contained therein.

FIG. 4 also illustrates a broader principle. That is, and one of ordinary skill in the art will appreciate, that the exciter antenna elements and reader antenna elements may be secured to various portions of canopy assembly 12. For example, exciter antenna 222 may be positioned on either of first vertical support member 16 and second vertical support member 18 with reader antenna 224 being position on the other, and/or on canopy member 20. Selection of the locations of exciter antenna 222 and reader antenna 224 will of course be done with consideration given to the particular application and to the system performance requirements.

Figure 5:
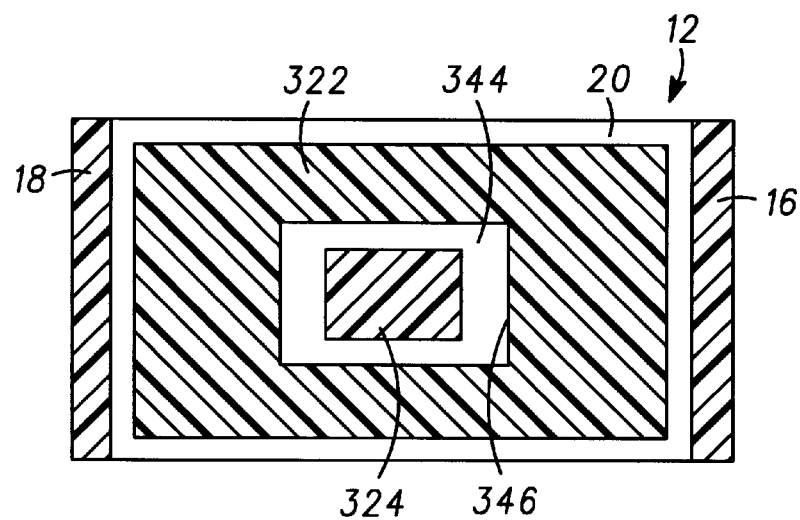
FIG. 5 is a cross-section viewed along line 5—5 of FIG. 2 illustrating still another alternate preferred embodiment of the present invention.
Figure 6:
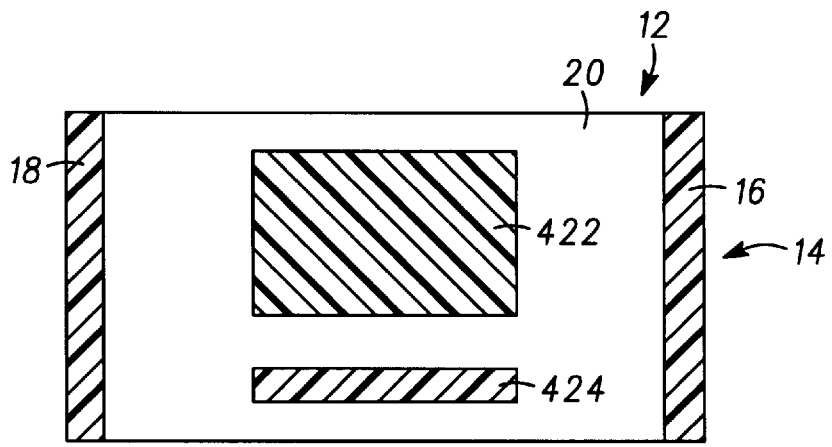
FIG. 6 is a cross-section similar to FIG. 5, and illustrating another alternate preferred embodiment of the present invention.

As discussed so far with reference to FIG. 1 and FIG. 2, each of exciter antenna 22 and reader antenna 24 have been formed from plates of conductive material, such as copper. FIG. 5 and FIG. 6 illustrate at least two alternative arrangements for the exciter antenna and the reader antenna. With reference to FIG. 5, exciter antenna 322 is formed from a conductive material and with an outer dimension approaching that of canopy member 20. Exciter antenna 322 further includes an aperture 346 formed therein at a center portion 344. Reader antenna 324 is a substantially rectangular plate of conductive material secured to canopy member 20 and disposed within aperture 346. As seen in FIG. 6, exciter antenna 422 is a substantially rectangular plate of conductive material. Reader antenna 424 is a strip of conductive material. Both exciter antenna 422 and reader antenna 424 are secured to canopy member 20. The embodiments shown for the exciter antenna and the reader antenna in each of FIG. 5 and FIG. 6 provide for a substantially increased exciter antenna area, which improves the coupling of exciter signal 36 to radio frequency identification tag 112.

Figure 7:
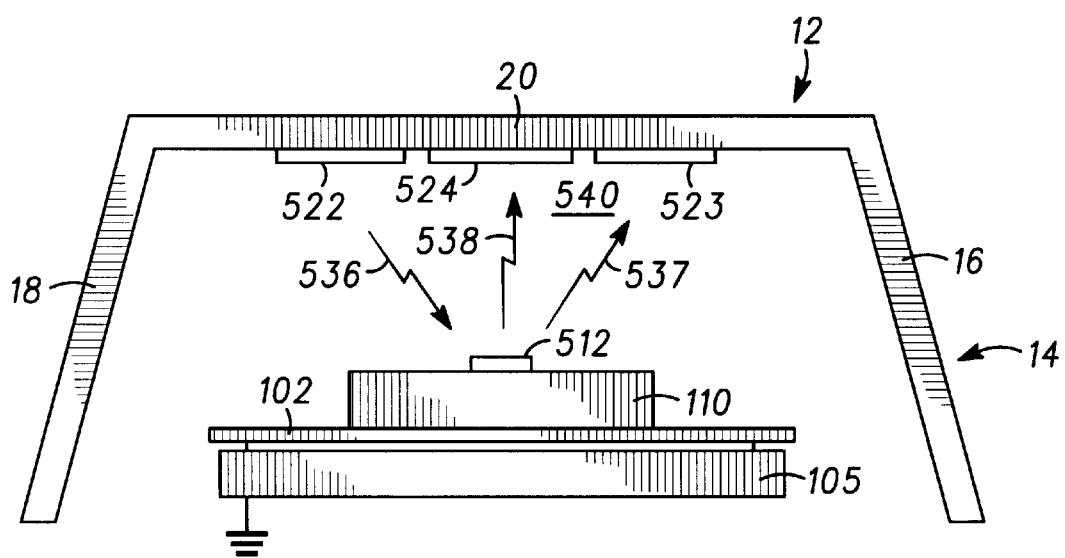
FIG. 7 is a cross-section similar to FIG. 2, and illustrating yet another alternate preferred embodiment of the present invention.

Radio frequency identification tag exciter/readers in accordance with preferred embodiments of the present invention are also adaptable for operation with radio frequency identification tags having a dipole antenna configuration. With reference to FIG. 7, a first exciter antenna 522 and a second exciter antenna 523 are secured to canopy member 20. A reader antenna 524 is also secured to canopy member 20. Each of first exciter antenna 522, second exciter antenna 523 and reader antenna 524 are a plate of conductive material, such as copper. Article 110 includes a radio frequency identification tag 512 arranged with a dipole antenna, and article 110 is situated in an excite/read zone 540.

A first exciter signal 536 is coupled from first exciter antenna 522 to radio frequency identification tag 512 and a second exciter signal 537 is coupled from radio frequency identification tag 512 to second exciter antenna 523. Radio frequency identification tag 512 becomes energized in response to first exciter signal 536 and second exciter signal 537. In response to its programming, radio frequency identification tag 512 generates a read signal 538, which is coupled to reader antenna 524. This arrangement is particularly advantageous where coupling of the radio frequency identification tag to ground is impractical, or ineffectual.

Figure 8:
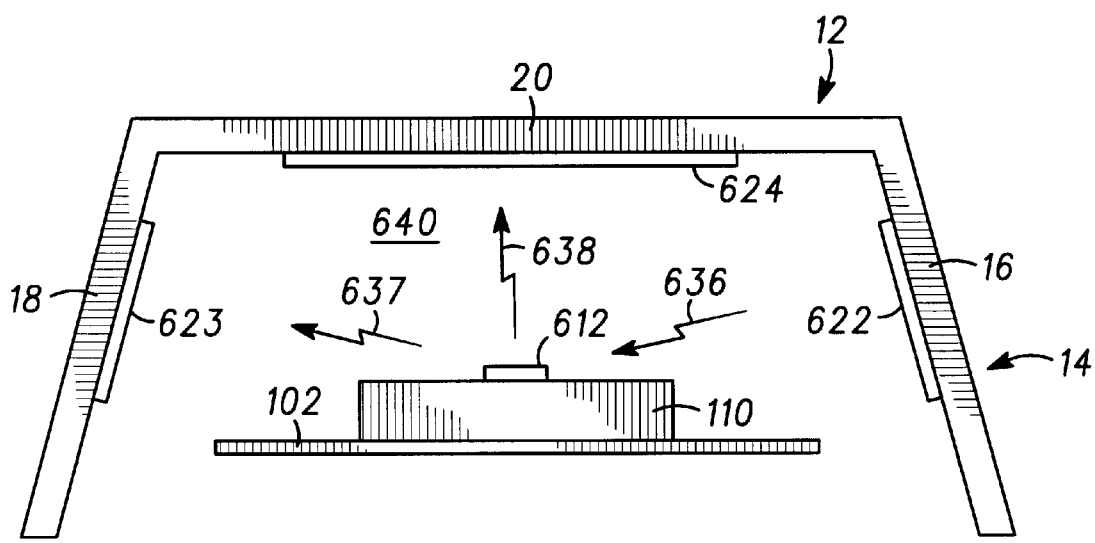
FIG. 8 is a cross-section similar to FIG. 7, and illustrating another alternate preferred embodiment of the present invention.

With reference to FIG. 8, an alternate preferred arrangement of a radio frequency identification tag exciter/reader adapted for operation with radio frequency identification tags having a dipole antenna configuration is shown. A first exciter antenna 622 and a second exciter antenna 623 are secured, respectively, to first vertical support member 16 and second vertical support member 18. A reader antenna 624 is secured to canopy member 20. Each of first exciter antenna 622, second exciter antenna 623 and reader antenna 624 are a plate of conductive material, such as copper. Article 110 includes a radio frequency identification tag 612 arranged with a dipole antenna, and article 110 is situated in an excite/read zone 640.

A first exciter signal 636 is coupled from first exciter antenna 622 to radio frequency identification tag 612 and a second exciter signal 637 is coupled from radio frequency identification tag 612 to second exciter antenna 623. Radio frequency identification tag 612 becomes energized in response to first exciter signal 636 and second exciter signal 637. In response to its programming, radio frequency identification tag 612 generates a read signal 638, which is coupled to reader antenna 624.

Figure 9:
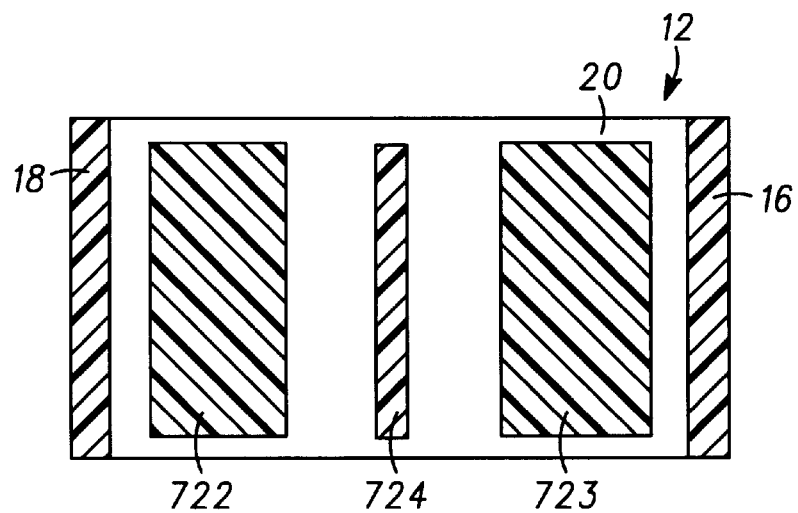
FIG. 9 is a cross-section viewed along line 5—5 of FIG. 2 illustrating still another alternate preferred embodiment of the present invention.

In the embodiments shown in FIG. 7 and FIG. 8, each of the exciter antenna and the reader antenna have been described as plates of conductive material. With reference to FIG. 9, an alternate arrangement for the exciter antenna elements and the reader antenna elements for a radio frequency identification tag exciter/reader adapted for operation with radio frequency identification tags having a dipole antenna configuration is shown. As can be seen in FIG. 9, first exciter antenna 722 and second exciter antenna 723 are rectangular plates of conductive material disposed at opposite ends of canopy member 20. Reader antenna 724 is a strip of conductive material disposed between first exciter antenna 722 and second exciter antenna 723. The embodiment shown for first exciter antenna 722, second exciter antenna 723 and reader antenna 724 in FIG. 9 provides for a substantially increased exciter antenna area, improving the coupling of the exciter signal to the radio frequency identification tag.

Figure 10:
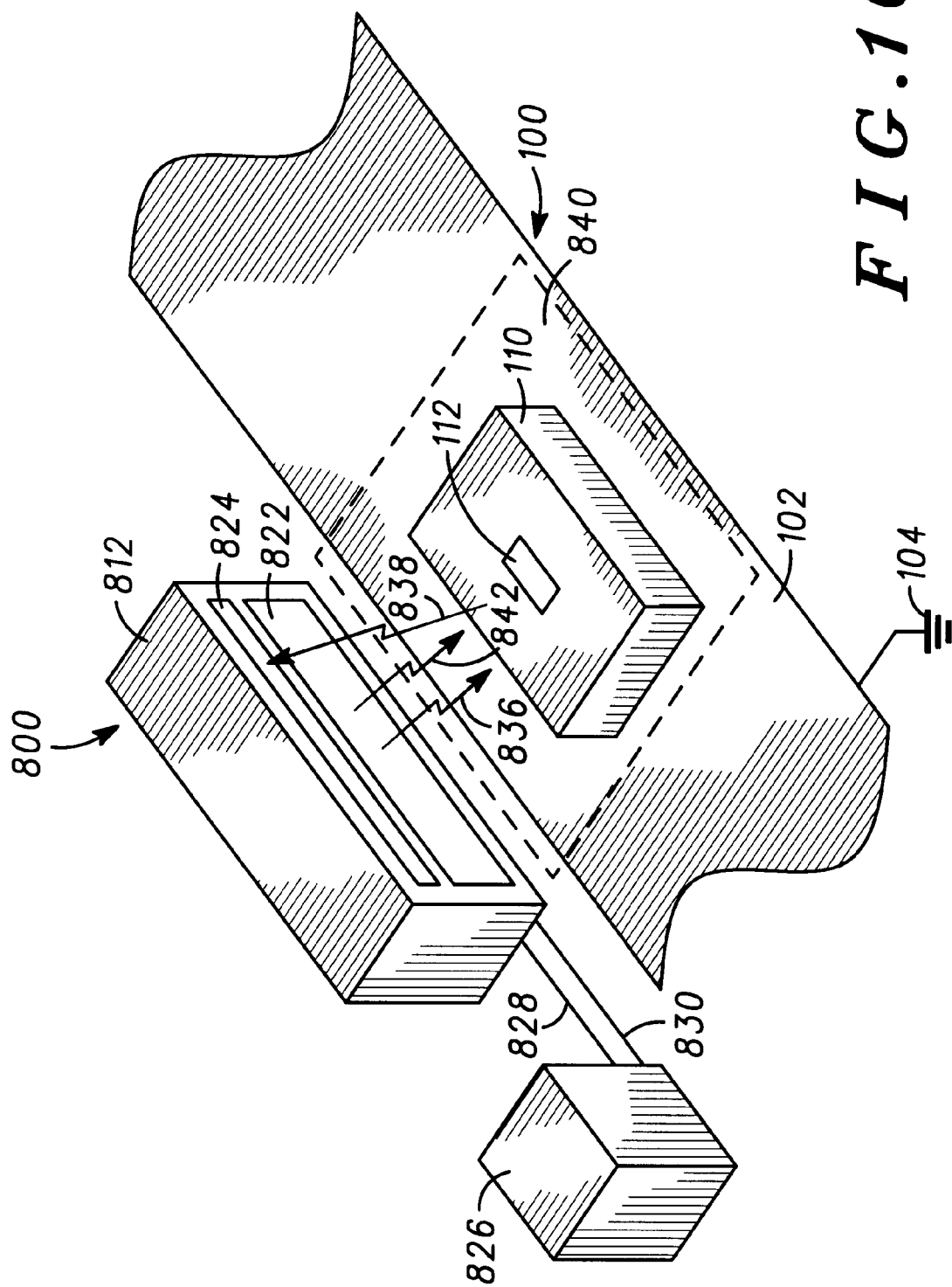
FIG. 10 is a perspective view of a radio frequency identification tag exciter/reader arranged in association with an article transport device and in accordance with an alternate preferred embodiment of the present invention.

With reference now to FIG. 10, a radio frequency identification tag exciter/reader 800 in accordance with yet another alternate preferred embodiment of the present invention is shown in association with article transport device 100 including belt 102. Radio frequency identification tag exciter/reader 800 includes supported within a housing 812, an exciter antenna 822 and a reader antenna 824. Exciter antenna 822 is coupled to a base station 826 by an antenna lead 828 and reader antenna 824 is coupled to base station 826 by an antenna lead 830. Housing 812 is situated adjacent belt 102 with exciter antenna 822 and reader antenna 824 oriented toward belt 102 and defining an exciter/read zone 840 (indicated in phantom in FIG. 10). Radio frequency identification tag exciter/reader 800 is further arranged for operation with radio frequency identification tags arranged for coupling to ground, and belt 102 is arranged to provide a suitable coupling to ground 104.

Base station 826 includes appropriate processing, modulation and amplification capability for generating an exciter signal and coupling the exciter signal to exciter antenna 822. Base station 826 also includes suitable processing and demodulation capability to receive and process a read signal from reader antenna 824. For example, a suitable base station is a modified ASR-120 base station (part no. 05200-006) available from Indala Corporation, a wholly-owned subsidiary of Motorola, Inc., 3041 Orchard Parkway, San Jose, Calif. 95134. As article 110 enters an excite/read zone 840 adjacent housing 812, an exciter signal 836 is coupled from exciter antenna 822 to radio frequency identification tag 112. Radio frequency identification tag 112 becomes energized in the presence of exciter signal 836, and in accordance with its circuitry and programming, generates a read signal 838, which is coupled from radio frequency identification tag 112 to reader antenna 824. It will be appreciated that read/write operations may be accomplished, and in this regard, base station 826 may be arranged to provide in addition to exciter signal 836, a write, or data, signal 842. Radio frequency identification tag 112 receives write signal 842, which may contain data to be written to a memory contained within radio frequency identification tag 112, a code to be stored or a command to be acted upon. Radio frequency identification tag 112 provides the appropriate response to write signal 842, and if appropriate, responds by generating read signal 838 based upon the newly stored information.

Figure 11:
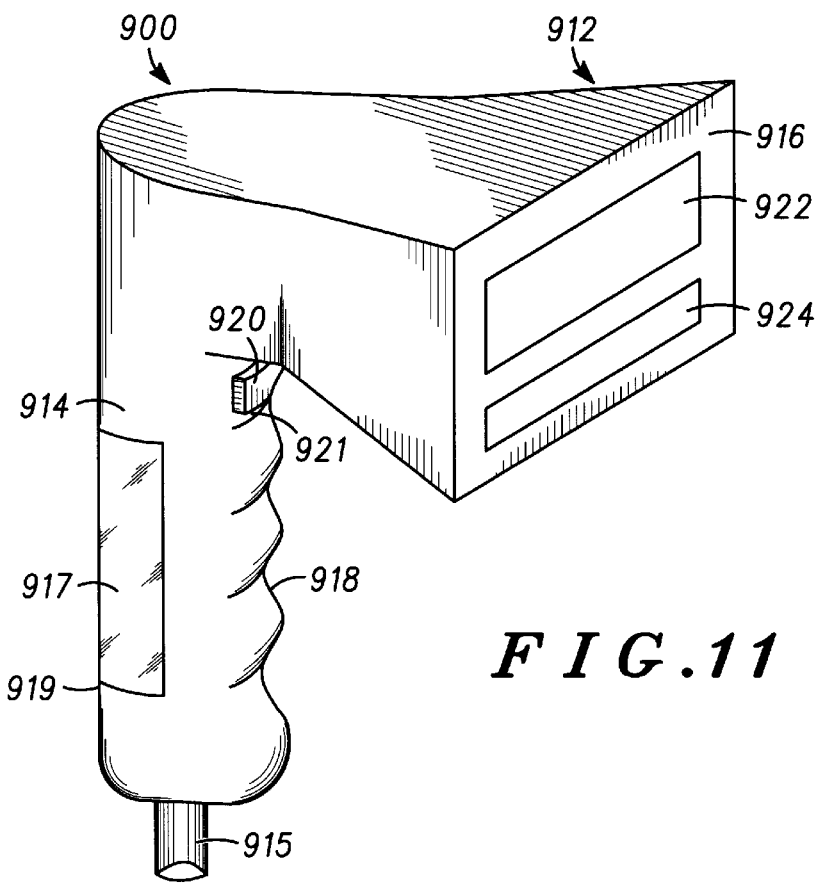
FIG. 11 is a perspective view of a portion of a radio frequency identification tag exciter/reader arranged for hand held operation and in accordance with a preferred embodiment of the present invention.
Figure 12:
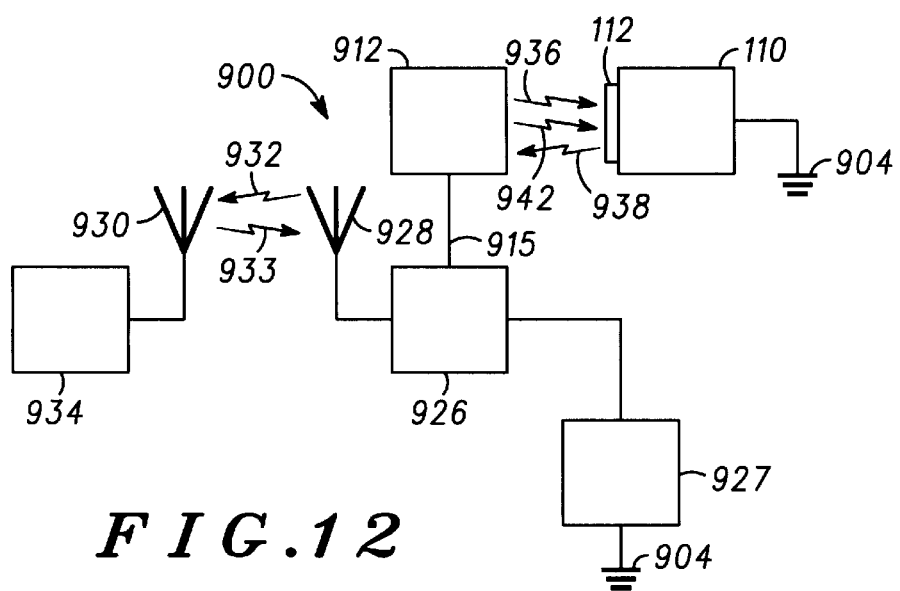
FIG. 12 is a block diagram of a radio frequency identification tag exciter/reader in accordance with a preferred embodiment of the present invention.

In certain applications, the articles being identified using a radio frequency identification tag are not conveyed or otherwise moved along an article transport device. In this regard, it would be convenient to bring the radio frequency identification tag exciter/reader to the article. With reference to FIG. 11 and FIG. 12 a radio frequency identification tag exciter/reader 900 includes a hand holdable housing 912. As best seen in FIG. 11, housing 912 is formed with a body portion 914 including an antenna head 916 and a grip portion 918. Antenna head 916 includes an exciter antenna 922 and a reader antenna 924. Exciter antenna 922 is a substantially rectangular plate of conductive material, such as copper, a reader antenna 924 is a strip of conductive material, which may also be copper. Grip portion 918 is contoured to fit a hand, and includes a trigger button 920 adjacent an index finger contour 921. As will be explained, depressing trigger button 920 initiates an excite/read function.

Radio frequency identification tag exciter/readers 900 is arranged for use with radio frequency identification tags arranged for coupling to ground. In this regard, grip portion 918 further includes a conductive member 917 adjacent a palm rest 919. Conductive member 917 is arranged to couple to the human operator, who in turn, couples to ground and thereby providing an effective coupling to ground. Housing 912 further includes a wire connection 915 for coupling to a portable base station 926.

With reference to FIG. 12, housing 912, including exciter antenna 922 and reader antenna 924, is coupled via suitable antenna leads and wire connection 915 to portable base station 926. It should be appreciated that a separate base station device need not be provided, and the base station processing, power supply and related electronics may be packaged as a unit within housing 912. Portable base station 926 includes a suitable power supply, such as a rechargeable battery, and processing, modulation and amplification capability for generating an exciter signal and coupling the exciter signal to exciter antenna 922. Portable base station 926 also includes suitable processing and demodulation capability to receive and process a read signal from reader antenna 924. For example, portable base station 926 may be based upon a modified ASR-120 base station (part no. 05200-006) available from Indala Corporation, a wholly-owned subsidiary of Motorola, Inc., 3041 Orchard Parkway, San Jose, Calif. 95134.

In operation, housing 912 is brought near article 110 including radio frequency identification tag 112, and button 920 is depressed. Article 110 is coupled to ground 904, such as through an inventory rack, an article conveyor, and the like. Radio frequency identification tag exciter/reader 900 couples through ground 904 through a user's body shown as 927. Portable base station 926 generates an exciter signal 936. Exciter signal 936 is coupled from exciter antenna 922 to radio frequency identification tag 112. Radio frequency identification tag 112 becomes energized in the presence of exciter signal 936, and in accordance with its circuitry and programming, generates a read signal 938, which is coupled from radio frequency identification tag 112 to reader antenna 924. It will be appreciated that read/write operations may be accomplished, and in this regard, base station 926 may be arranged to provide in addition to exciter signal 936, a write, or data, signal 942. Radio frequency identification tag 112 receives write signal 942, which may contain data to be written to a memory contained within radio frequency identification tag 112, a code to be stored or a command to be acted upon. Radio frequency identification tag 112 provides the appropriate response to write signal 942, and if appropriate, responds by generating read signal 938 based upon the newly stored information.

Portable base station 926 further includes a transceiver (not shown) and an antenna 928. A system element 934, such as an inventory control system or the like, includes a transceiver (not shown) and an antenna 930. Portable base station 926 and system element 934 communicate by radio signals 932 and 933. In this manner, data read from radio frequency identification tag 112 may be communicated to system element 934, and data from system element 934 may be communicated to radio frequency identification tag 112. For example, an on-shelf inventory may be completed in which items of inventory having radio frequency identification tags are read using radio frequency identification tag exciter/reader 900. The status of the inventory is thus updated in system element 934. Similarly, pricing data, including price change data, may be communicated from system element 934 to radio frequency identification tag 112 and stored therein.

Figure 13:
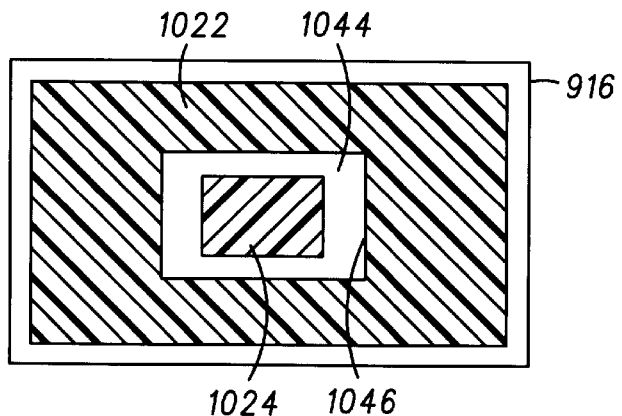
FIG. 13 is an end view of the portion of the radio frequency identification tag exciter/reader shown in FIG. 11, and particularly illustrating a preferred antenna arrangement.
Figure 14:
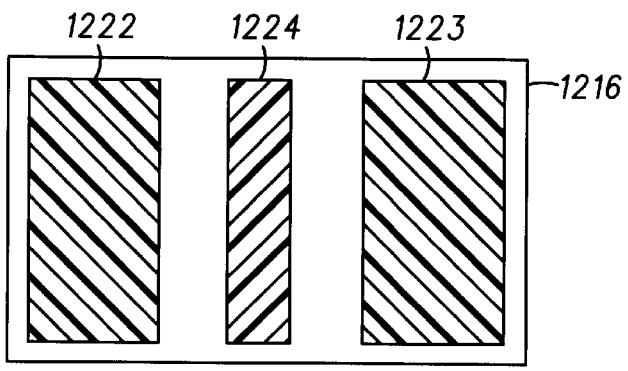
FIG. 14 is an end view of the portion of the radio frequency identification tag exciter/reader shown in FIG. 11, and particularly illustrating a alternate preferred antenna arrangement.

As discussed with reference to FIG. 11, each of exciter antenna 922 and reader antenna 924 are formed from plates of conductive material, such as copper. FIGS. 13 and 14 illustrate at least two alternative arrangements of the exciter antenna and the reader antenna. With reference to FIG. 13, exciter antenna 1022 is formed from a conductive material and with an outer dimension approaching that of antenna head 916. Exciter antenna 1022 further includes an aperture 1046 formed therein at a center portion 1044. Reader antenna 1024 is a substantially rectangular plate of conductive material secured to antenna head 916 and disposed within aperture 1046. As seen in FIG. 14, exciter antenna 1122 is an annular shaped plate of conductive material. Reader antenna 1124 is a circular plate of conductive material disposed within an aperture 1146 of exciter antenna 1122. Both exciter antenna 1122 and reader antenna 1124 are secured to antenna head 1116. The embodiments shown for the exciter antenna and the reader antenna in each of FIG. 13 and FIG. 14 provide for a substantially increased exciter antenna area, which improve the coupling of exciter signal 936 to radio frequency identification tag 112.

Figure 15:
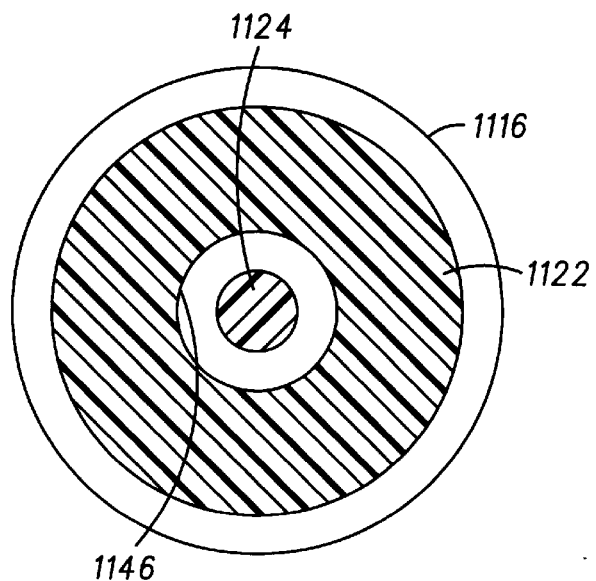
FIG. 15 is an end view of the portion of the radio frequency identification tag exciter/reader shown in FIG. 11, and particularly illustrating an alternate preferred antenna arrangement.

It will be appreciated that radio frequency identification tag exciter/reader 900 may also be adapted for use with radio frequency identification tags having a dipole antenna. With reference to FIG. 15, antenna head 1216 is outfitted with a first exciter antenna 1222, a second exciter antenna 1223 and a reader antenna 1224. First exciter antenna 1222 and second exciter antenna 1223 are arranged to couple a first exciter signal and a second exciter signal to a dipole antenna of a radio frequency identification tag so arranged. Reader antenna 1224 is arranged to receive the read signal from the radio frequency identification tag.

Figure 16:
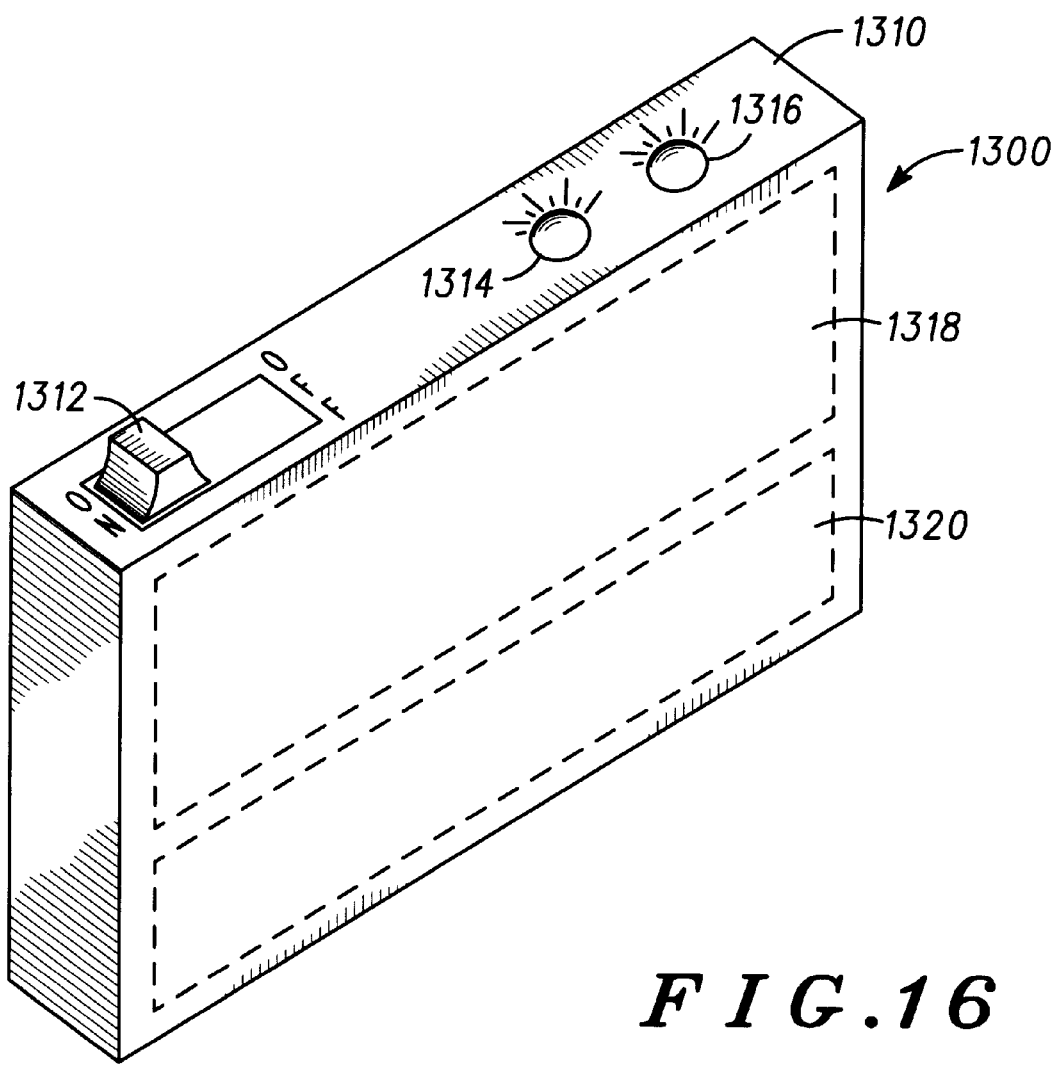
FIG. 16 is a perspective view of a radio frequency identification tag exciter/reader arranged for hand held operation and in accordance with an alternate preferred embodiment of the present invention.

Referring now to FIG. 16, a portable radio frequency identification tag exciter/reader 1300 is arranged for hand held operation. Exciter/reader 1300 is contained entirely within a housing 1310, preferably about 8 cm high by 12 cm long by 2 cm thick. Exciter/reader 1300 contains internally a portable base station including an exciter signal generator and a reader and a power source, such as a replaceable or rechargeable battery, is coupled to the portable base station. Exciter/reader 1300 is further arranged for coupling to ground, preferably through a user's body as described below.

Exciter/reader 1300 includes an on/off switch 1312, a power-on light emitting diode (LED) 1314 and a read verification light emitting diode 1316. Shown in phantom are an exciter antenna 1318 which is coupled to the exciter signal generator and a reader antenna 1320 which is coupled to the reader, it being appreciated that various alternative configurations of exciter and read antennae may be made. As shown, exciter antenna 1318 is arranged as a monopole antenna. A user switches exciter/reader 1300 on by moving on/off switch 1312 to the on position. Power on operation is indicated by power-on LED 1314. The user brings exciter/reader 1300 near an article, package, identification card, etc., including a radio frequency identification tag. The exciter signal couples from exciter/reader to the radio frequency identification tag, and the radio frequency identification tag generates a read signal. The radio frequency identification tag couples to ground through, for example, the article or person and exciter/reader 1300 couples to ground through the user's body.

The read signal couples from the radio frequency identification tag to read antenna 1320. Upon confirmation of the read signal, the read verification LED 1316 is illuminated. It will be appreciated that various configurations of LEDs, liquid crystal display (LCD) devices, and the like may be incorporated into exciter/reader 1300 such that radio frequency identification tag data may be read and displayed to the user. It will be further appreciated that an interface, such as a cable link or radio link, to a system element may be incorporated into exciter/reader 1300 without departing from the fair scope of the present invention.

Figure 17:
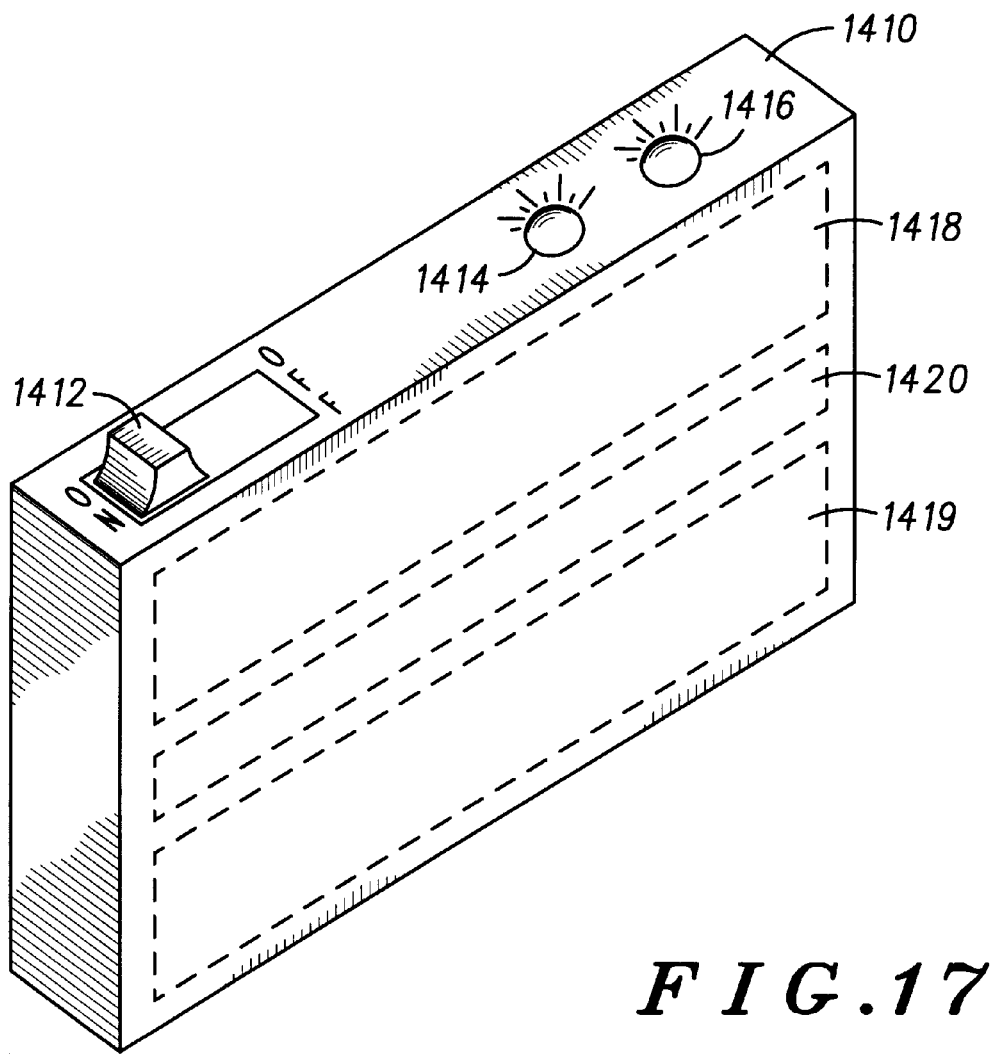
FIG. 17 is a perspective view of a radio frequency identification tag exciter/reader arranged for hand held operation and in accordance with an alternate preferred embodiment of the present invention.

Referring now to FIG. 17, a radio frequency identification tag exciter/reader 1400 is shown also arranged for hand held operation. Exciter/reader 1400 is contained entirely within a housing 1410, preferably about 8 cm high by 12 cm long by 2 cm thick, and is arranged for dipole operation. Exciter/reader 1400 contains internally a portable base station including an exciter signal generator and a reader and a power source, such as a replaceable or rechargeable battery, coupled to the portable base station.

Exciter/reader 1400 includes an on/off switch 1412, a power-on light emitting diode (LED) 1414 and a read verification LED 1416. Shown in phantom are a first exciter antenna 1418, a second exciter antenna 1419 which are coupled to the exciter signal generator and a reader antenna 1320 which is coupled to the reader, it being appreciated that various alternative configurations of exciter and read antennae may be made. As shown, first exciter antenna 1418 and second exciter antenna 1419 are arranged as a dipole antenna. A user switches exciter/reader 1400 on by moving on/off switch 1412 to the on position. Power on operation is indicated by power-on LED 1414. The user brings exciter/reader 1400 near an article, package, identification card, etc., including a radio frequency identification tag also of dipole construction. The exciter signal couples from first exciter antenna 1418 and second exciter antenna 1419 to antennae on the radio frequency identification tag, and the radio frequency identification tag generates a read signal.

The read signal couples from the radio frequency identification tag to read antenna 1420. Upon confirmation of the read signal, the read verification LED 1416 is illuminated. It will be appreciated that various configurations of LEDs, liquid crystal display (LCD) devices, and the like may be incorporated into exciter/reader 1400 such that radio frequency identification tag data may be read and displayed to the user. It will be further appreciated that an interface, such as a cable link or radio link, to a system element may be incorporated into exciter/reader 1400 without departing from the fair scope of the present invention.

In summary and referring to FIG. 1 of the drawings, a radio frequency identification tag exciter/reader 10 includes a canopy assembly 14 disposed above an article transport device 100. An exciter antenna 22 is secured to canopy assembly 14 and a reader antenna 24 is also secured to canopy assembly 14. A base station 26 is provided and exciter antenna 22 and reader antenna 24 are coupled to base station 26. Base station 26 generates an exciter signal 36 and couples exciter signal 36 to exciter antenna 22 and receives read signals 38 received at reader antenna 24.

Exciter/reader 10 is coupled to ground 104, and radio frequency identification tags 112 secured to articles, packages and the like (110) moving along article transport device 100 are arranged to couple to ground 104 through the structure 105 of article transport device 100. Properly configured, the radio frequency identification tag information may be read without regard to orientation of the package, and more particularly, without line of sight access to the tag as required by bar code and other optical systems. Base station 26 may be further coupled to other system elements, such as inventory management or article sortation and tracking systems. Exciter/reader 10 may be further incorporated into a manufacturing operation to track work-in-process, inventory and the like.

Referring to FIG. 11, a radio frequency identification tag exciter/reader 900 arranged for hand held operation includes housing 912 including an antenna head 916 and a grip portion 918. An exciter antenna 922 and a reader 924 are secured to antenna head 916, and antenna head 916 is coupled to a portable base station 926. Portable base station 926 generates an exciter signal 936 and couples exciter signal 936 to exciter antenna 922 and receives read signals 938 received at reader antenna 924. Radio frequency identification tags to be read are preferably arranged to couple to ground through an article or package to which it is attached, and exciter/reader 900 is arranged to couple to ground through a user's body.

Exciter/reader 900 provides tremendous flexibility as it may be carried to the radio frequency identification tags to be read. For example, in a inventory/stock keeping operation, exciter/reader 900 may be taken into a warehouse environment and with the inventory, equipped with radio frequency identification tags, the inventory may be read and recorded. Additionally, exciter/reader 900 may be arranged to generate a write signal 938 and the radio frequency identification tags, responsive to the write signal, may change stored information contained therein. In this manner, price or other inventory data may be updated on the radio frequency identification tags. Neither direct line of sight nor particular package orientation are required to read the radio frequency identification tag information (if proper conveyor design is employ), which provides a tremendous advantage over bar code and other similar optical system.

Many additional changes and modifications could be made to the invention without departing from the fair scope and spirit thereof. The scope of some change is discussed above. The scope of others will become apparent from the appended claims.

We claim:

1. A radio frequency identification tag exciter/reader comprising:
   a canopy assembly disposed above an article transport device, the article transport device being arranged to couple to ground;
   an exciter antenna secured to the canopy assembly;
   a reader antenna secured to the canopy assembly; and
   a base station, the exciter antenna and the reader antenna coupled to the base station and the base station arranged to generate an exciter signal and to couple the exciter signal to the exciter antenna and to receive from the reader antenna a read signal.

2. The radio frequency identification tag exciter/reader of claim 1, the base station arranged to generate a write signal and to couple the write signal to the exciter antenna.

3. The radio frequency identification tag exciter/reader of claim 1, the base station further coupled to a system element.

4. The radio frequency identification tag exciter/reader of claim 3, the system element comprising one of an article sorting system, an inventory tracking system and a manufacturing system.

5. The radio frequency identification tag exciter/reader of claim 1, the canopy assembly comprising a first vertical support member, a second vertical support member and a canopy member.

6. The radio frequency identification tag exciter/reader of claim 5, the exciter antenna and the reader antenna secured to the canopy member.

7. The radio frequency identification tag exciter/reader of claim 5, the exciter antenna secured to one of the first vertical support member and the second vertical support member.

8. The radio frequency identification tag exciter/reader of claim 5, the reader antenna secured to one of the first vertical support member and the second vertical support member.

9. A radio frequency identification tag exciter/reader comprising:
   a canopy assembly disposed above an article transport device, the canopy assembly comprising a first vertical support member, a second vertical support member and a canopy member;
   an exciter antenna secured to the canopy assembly;
   a reader antenna secured to the canopy assembly, the reader antenna comprising a first reader antenna and a second reader antenna, the first reader antenna secured to the first vertical support member and the second reader antenna secured to the second vertical support member; and
   a base station, the exciter antenna and the reader antenna coupled to the base station and the base station arranged to generate an exciter signal and to couple the exciter signal to the exciter antenna and to receive from the reader antenna a read signal.

10. A radio frequency identification tag exciter/reader comprising:
    a canopy assembly disposed above an article transport device, the canopy assembly comprising a first vertical support member, a second vertical support member and a canopy member;
    an exciter antenna, the exciter antenna comprising a first exciter antenna and a second exciter antenna, the first exciter antenna and the second exciter antenna secured to the canopy member;
    a reader antenna secured to the canopy assembly; and
    a base station, the exciter antenna and the reader antenna coupled to the base station and the base station arranged to generate an exciter signal and to couple the exciter signal to the exciter antenna and to receive from the reader antenna a read signal.

11. A radio frequency identification tag exciter/reader comprising:
    a canopy assembly disposed above an article transport device, the canopy assembly comprising a first vertical support member, a second vertical support member and a canopy member;
    an exciter antenna secured to the canopy assembly, the exciter antenna comprising a first exciter antenna and a second exciter antenna, the first exciter antenna secured to the first vertical support member and the second exciter antenna secured to the second vertical support member;
    a reader antenna secured to the canopy assembly; and
    a base station, the exciter antenna and the reader antenna coupled to the base station and the base station arranged to generate an exciter signal and to couple the exciter signal to the exciter antenna and to receive from the reader antenna a read signal.

12. A radio frequency identification tag exciter/reader comprising:
    a canopy assembly disposed above an article transport device;
    a first exciter antenna and a second exciter antenna secured to the canopy assembly;
    a reader antenna secured to the canopy assembly; and
    a base station, the first exciter antenna, the second exciter antenna and the reader antenna coupled to the base station and the base station arranged to generate a first exciter signal and to couple the first exciter signal to the first exciter antenna, to generate a second exciter signal and to couple the second exciter signal to the second exciter antenna and to receive from the reader antenna a read signal.

13. The radio frequency identification tag exciter/reader of claim 12, the base station arranged to generate a write signal and to couple the write signal to one of the first exciter antenna and the second exciter antenna.

14. The radio frequency identification tag exciter/reader of claim 12, the base station further coupled to a system element.

15. The radio frequency identification tag exciter/reader of claim 14, the system element comprising one of an article sorting system, an inventory tracking system and a manufacturing system.

16. The radio frequency identification tag exciter/reader of claim 12, the canopy assembly comprising a first vertical support member, a second vertical support member and a canopy member.

17. The radio frequency identification tag exciter/reader of claim 16, the first exciter antenna, the second exciter antenna and the reader antenna secured to the canopy member.

18. The radio frequency identification tag exciter/reader of claim 16, the first exciter antenna secured to the first vertical support member and the second exciter antenna secured to the second vertical support member.

19. The radio frequency identification tag exciter/reader of claim 16, the reader antenna secured to one of the first vertical support member and the second vertical support member.

20. A radio frequency identification tag exciter/reader comprising:
    a housing disposed adjacent an article transport device, the article transport device being arranged to couple to ground;
    an exciter antenna secured to the housing;
    a reader antenna secured to the housing; and
    a base station, the exciter antenna and the reader antenna coupled to the base station and the base station arranged to generate an exciter signal and to couple the exciter signal to the exciter antenna and to receive from the reader antenna a read signal.

21. The radio frequency identification tag exciter/reader of claim 20, the base station arranged to generate a write signal and to couple the write signal to the exciter antenna.

22. The radio frequency identification tag exciter/reader of claim 20, the base station further coupled to a system element.

23. The radio frequency identification tag exciter/reader of claim 22, the system element comprising one of an article sorting system, an inventory tracking system and a manufacturing system.

24. A radio frequency identification tag exciter/reader comprising:
    a housing disposed adjacent an article transport device;
    an exciter antenna secured to the housing, the exciter antenna comprising a first exciter antenna and a second exciter antenna;
    a reader antenna secured to the housing; and
    a base station, the exciter antenna and the reader antenna coupled to the base station and the base station arranged to generate an exciter signal and to couple the exciter signal to the exciter antenna and to receive from the reader antenna a read signal.

25. A radio frequency identification tag exciter/reader comprising:
    a housing the housing including an antenna head and a grip portion and the housing arranged to couple to ground;
    an exciter antenna secured to the antenna head;
    a reader antenna secured to the antenna head; and
    a portable base station, the exciter antenna and the reader antenna coupled to the portable base station and the portable base station arranged to generate an exciter signal and to couple the exciter signal to the exciter antenna and to receive from the reader antenna a read signal.

26. The radio frequency identification tag exciter/reader of claim 25, the housing arranged to couple to ground through a user's body.

27. The radio frequency identification tag exciter/reader of claim 25, the portable base station arranged to generate a write signal and to couple the write signal to the exciter antenna.

28. The radio frequency identification tag exciter/reader of claim 25, the portable base station further coupled to a system element.

29. The radio frequency identification tag exciter/reader of claim 28, the system element comprising one of an article sorting system, an inventory tracking system and a manufacturing system.

30. The radio frequency identification tag exciter/reader of claim 25, the grip portion including a trigger button, and the portable base station arranged to generate an exciter signal and to couple the exciter signal to the exciter antenna and to receive from the reader antenna a read signal in response to selective actuation of the trigger button.

31. A radio frequency identification tag exciter/reader comprising:
    a housing, the housing including an antenna head and a grip portion;
    an exciter antenna secured to the antenna head;
    a reader antenna secured to the antenna head; and
    a portable base station, the exciter antenna, the reader antenna and a system element coupled to the portable base station and the portable base station arranged to generate an exciter signal and to couple the exciter signal to the exciter antenna and to receive from the reader antenna a read signal, wherein the portable base station is coupled to the system element by radio signals.

32. A radio frequency identification tag exciter/reader comprising:
    a housing, the housing including an antenna head and a grip portion;
    an exciter antenna secured to the antenna head, the exciter antenna comprising a first exciter antenna and a second exciter antenna;
    a reader antenna secured to the antenna head; and
    a portable base station, the exciter antenna and the reader antenna coupled to the portable base station and the portable base station arranged to generate an exciter signal and to couple the exciter signal to the exciter antenna and to receive from the reader antenna a read signal.

33. A portable radio frequency identification tag exciter/reader comprising:
    a housing containing a portable base station including an exciter signal generator and a reader, a power source coupled to the portable base station, an exciter antenna coupled to the exciter signal generator and a reader antenna coupled to the reader, the exciter antenna arranged as a monopole antenna and the portable radio frequency identification tag exciter/reader arranged for coupling to ground;
    an on/off switch to activate the portable base station;
    a power-on light emitting diode indicating power on operation; and
    a read verification light emitting diode responsive to a read signal from a radio frequency identification tag.

34. The portable radio frequency identification tag exciter/reader of claim 33, further comprising an interface, the interface arranged to couple the portable radio frequency identification tag exciter/reader to a system element.

35. The portable radio frequency identification tag exciter/reader of claim 33, the interface comprising one of a cable link and a radio link.

36. The portable radio frequency identification tag exciter/reader of claim 33 arranged for coupling to ground through a user's body.

37. A portable radio frequency identification tag exciter/reader comprising:
   a housing containing a portable base station including an exciter signal generator and a reader, a power source coupled to the portable base station, an first exciter antenna and a second exciter antenna each coupled to the exciter signal generator and a reader antenna coupled to the reader, the first exciter antenna and the second exciter antenna arranged as a dipole antenna;
   an on/off switch to activate the portable base station;
   a power-on light emitting diode indicating power on operation; and
   a read verification light emitting diode confirming receipt of a read signal from a radio frequency identification tag.

38. The portable radio frequency identification tag exciter/reader of claim 37, further comprising an interface, the interface arranged to couple the portable radio frequency identification tag exciter/reader to a system element.

39. The portable radio frequency identification tag exciter/reader of claim 37, the interface comprising one of a cable link and a radio link.

\* \* \* \* \*